United States Patent [19]
Dalan et al.

[11] Patent Number: 5,223,299
[45] Date of Patent: Jun. 29, 1993

[54] PRODUCTION OF EVAPORATED MILK PRODUCT WITHOUT STABILIZING SALTS

[75] Inventors: Ernesto Dalan, Blonay; Markus A. Henggeler, Oberweningen, both of Switzerland

[73] Assignee: Nestec S.A., Vevey, Switzerland

[21] Appl. No.: 618,396

[22] Filed: Nov. 27, 1990

[30] Foreign Application Priority Data

Dec. 19, 1989 [EP] European Pat. Off. ........... 89123416

[51] Int. Cl.$^5$ .............................................. A23C 9/00
[52] U.S. Cl. .................................... 426/587; 426/519; 426/522; 426/583
[58] Field of Search ............... 426/583, 585, 587, 519, 426/520, 521, 522, 800, 801, 491, 492

[56] References Cited

U.S. PATENT DOCUMENTS 2,473,493  6/1949  Otting et al. ..................... 426/587

OTHER PUBLICATIONS

Barabanshchikov, N. et al., International Dairy Congress, 1982, pp. 42–55.

Kiesecker, F. G., Bulletin, International Dairy Federation, 1982, No. 142, pp. 79–88.

Sjollema, A., Netherlands Milk and Dairy Journal, 1988, 42(4), pp. 365–374.

*Primary Examiner*—Joseph Golian
*Assistant Examiner*—Leslie Wong
*Attorney, Agent, or Firm*—Vogt & O'Donnell

[57] ABSTRACT

Evaporated milk which is stable in storage without the addition of stabilizing salts is prepared by homogenizing a milk product, heat-treating the homogenized milk, evaporatively concentrating the milk, heat-treating the concentrate, homogenizing the heat-treated concentrate and then sterilizing the heat-treated concentrate. Alternatively, a lactic product containing phospholipids derived from milk is mixed with a milk product, the mixture is heat-treated, the heat-treated mixture is evaporatively concentrated, the concentrate is heat-treated, the heat-treated concentrate is homogenized, and then the homogenized heat-treated concentrate is sterilized. Further, alternatively, the milk product is first heat-treated and then evaporatively concentrated, a lactic product containing phospholipids derived from milk is mixed with the concentrate, the mixture is heat-treated, then homogenized and then sterilized.

12 Claims, 2 Drawing Sheets

PRODUCTION OF EVAPORATED MILK PRODUCT WITHOUT STABILIZING SALTS

BACKGROUND OF THE INVENTION

This invention relates to a process for the production of an evaporated milk product containing fats.

Evaporated milk or cream is prepared from whole milk or cream by partial elimination of the water which it contains. The effect of this concentration is to bring together the fatty globules which can cause the fats to rise during storage. Finally, evaporated milk has to be sterilized because it is intended for prolonged storage.

When sterilization is carried out by a thermal appertization treatment after packing, for example in cans, there is an increased risk of destabilization of the liquid phase by the heat applied due to the disturbance of the caseinate/calcium phosphate system after concentration. During storage, the milk thus treated can thicken and then gel. A typical method of overcoming this particular disadvantage is to add stabilizing salts, such as for example disodium phosphate or trisodium citrate. However, these additives are being contested to an increasing extent by food legislation.

One alternative to sterilization by appertization is aseptic packing of the evaporated milk which has been sterilized on-line, for example by ultra-high temperature or high temperature short-time. The latter process does not prevent harmful crystallization of the calcium citrate or even gelling during storage.

SUMMARY OF THE INVENTION

The object of the present invention is to provide a process for the production of an evaporated milk product free from non-lactic additives which is stable in storage and which is not affected by the acidity of coffee.

Accordingly, the present invention relates to a process for the production of an evaporated milk product containing fats which is stable in storage and free from non-lactic additives, in which a milk product having a ratio by weight of fats to non-fat dry matter of 0.1:1 to 1.2:1 is heat-treated and then concentrated to a dry matter content of 20 to 40% by weight and the concentrate is sterilized.

The problem addressed by the invention is solved by the fact that the milk product is homogenized or the milk product is mixed with a natural lactic emulsifier, the homogenizate or mixture is heat-treated before being concentrated and the concentrate is heat-treated and then homogenized before being sterilized.

The evaporated milk product obtained in accordance with the invention is stable in storage in the same way as conventional products containing stabilizing salts. In addition, it can be sterilized without these additives which, hitherto, have been considered essential for avoiding gelling and/or coagulation during sterilization. In addition, it is totally unaffected by the acidity of a hot aqueous coffee extract and does not produce any flocculation when added to such an extract.

DETAILED DESCRIPTION OF THE INVENTION

To carry out the process, the whole milk is standardized where necessary, i.e., the respective quantities by weight of fats and non-fat solids are adjusted to the desired values by the addition as required of, for example, skimmed milk, cream or butter oil (anhydrous lactic fats).

In a first embodiment of the process, the milk product is preheated to 50°–100° C. after the standardization step and is then homogenized under intensified conditions. The object of the homogenization step is to increase the surface of the fatty globules in order more firmly to bind the proteins and thus to compensate the relative deficiency of membranal lipids. In the context of the invention, intensified homogenization is understood to mean that the product is treated by one or more passes through a homogenizer comprising one or more stages under pressures ranging from 50 to 500 bar, preferably by a single pass in two stages under a pressure of 200 to 300 bar for the first and then under a pressure of approximately 50 bar for the second. In this way, the dimensions of the fatty globules are reduced and homogeneously distributed.

The homogenizate is then heat-treated to stabilize the bonds between the proteins so that they remain intact after the concentration step. This heat treatment can be carried out by direct or indirect heating in any standard apparatus which enables the liquid to be kept at 80° to 150° C. for 1 to 1,200 s. The upper temperature limit naturally corresponds to the lower time limit. It is thus possible, for example, to combine a plate-type exchanger with a holding tube and a controlled counter-pressure valve, two plate-type exchangers connected by a holding tube or even a plate-type heat exchanger associated with a controlled counter-pressure valve and a thermostatically controlled holding tank.

After this heat treatment, the liquid is concentrated by evaporation with expansion to a dry matter content of 20 to 40% and preferably 24 to 35% by weight in a falling float evaporator of the single-effect or, preferably, multiple-effect type.

After concentration, the liquid is rehomogenized, preferably by a single pass through a two-stage homogenizer under a pressure of 75 to 175 bar in the first stage and approximately 25 bar in the second stage. The object of this second homogenization is to break up the clusters of fatty globules which have formed during the concentration step and, where necessary, further to reduce the size of these fatty globules.

After the second homogenization, the homogenized concentrate may be directly heat-treated or may be temporarily stored. In the first case, the dry matter content of the concentrate is optionally adjusted to the desired value for the end product, for example 24 to 33% by weight, by addition of water. In the second case, the concentrate is cooled to 1° to 10° C. and preferably to 4° to 8° C. and, after adjustment of its dry matter content in the same way as above, it is left standing for 1 to 24 h. The second heat treatment may even be carried out directly, i.e., without temporary storage.

The second heat treatment may be carried out in the same way as described above for the first heat treatment, i.e., by direct or indirect heating to 50° to 150° C. by injection of steam and, after a holding time of 1 to 600 s, by expansion in a vessel which results in cooling to 50° to 100° C. During this second heat treatment, the proteins bound by partial denaturing are stabilized. The bonds thus strengthened are sufficiently firm to ensure that the proteins no longer coagulate during subsequent sterilization.

Another homogenization step is then carried out under similar conditions to the second homogenization mentioned above and with the same objective, namely to break up the clusters of fatty globules formed. The homogenizate is then cooled to 0° to 20° C. and preferably to 4° to 8° C. and its dry matter content is adjusted where necessary to the desired value of the end product by the addition of water.

Finally, the milk product is sterilized, if necessary after intermediate storage. In a first embodiment of this sterilization step, the milk product is packed in containers, for example metal cans, glass bottles or heat-resistant plastic bottles, which are then hermetically sealed and then treated in a sterilizer for 30 s to 60 mins. at 95° to 135° C., the upper temperature limit corresponding to the shortest time, either in a single stage or in successive temperature stages.

A variant of the sterilization step comprises on-line sterilization followed by aseptic filling. To this end, the concentrate is preheated to 50° to 90° C., sterilized online by indirect or direct heating, for example at 105° to 150° C. for 2 s to 1 h, the upper temperture limit corresponding to the lower time limit, and preferably by high temperature short-time or by ultra-high temperature. The milk product is then cooled to 50° to 90° C., if necessary by expansion, and subsequently homogenized by one or more passes and in one or two stages under a pressure of 50 to 300 bar, preferably by a single pass under a pressure of 200 to 250 bar in the first stage and then under a pressure of approximately 50 bar in the second stage. Finally, the milk product is cooled to 4° to 30° C. and preferably to approximately 20° C. and packed in containers, for example metal cans or cartons. The oeprations following sterilization are of course carried out under aseptic conditions. In a second embodiment of the process, the first homogenization step is replaced by the addition of a natural lactic emulsifier to the starting mixture, all the other steps following the first homogenization step remaining unchanged. In the context of the invention, a natural lactic emulsifier is understood to be a milk derivative containing the majority of the milk phospholipids or polar lipids.

The natural lactic emulsifier is characterized in that it is a sweet buttermilk, or a buttermilk from production of butter oil or from production of anhydrous lactic fats, or a sweet buttermilk fraction freed from casein and lactose, or a fraction of buttermilk of anhydrous lactic fats freed from lactose, or mixtures thereof, or a whey fraction from the production of cooked cheeses, or a whey fraction from cooked curd cheese enriched with polar lipids. An emulsifier of this type may be selected from the following milk derivatives:

a sweet buttermilk consisting of the aqueous phase remaining after the separation of butter from cream,
a buttermilk consisting of the aqueous phase obtained from melted butter during the production of butter oil or anhydrous lactic fats,
a fraction of either of the preceding buttermilks which has been freed from proteins, partly or completely freed from lactose and/or freed from butter; for example by separation of the casein and ultrafiltration to remove the lactose; by centrifugation to remove the non-polar lipids,
a mixture of the preceding buttermilks or buttermilk fractions,
a whey fraction from the production of cooked cheeses, for example Parmesan, obtained by successive separations of the fatty phase by centrifugation to collect the polar lipids,
the preceding emulsifiers dried in powder form, if necessary after concentration.

The natural lactic emulsifier is preferably added in the form of a dispersion in an aqueous medium, for example produced by premixing in a colloid mill.

Alternatively, the emulsifier may be added to the concentrate after evaporation and before the subsequent homogenization step.

The natural lactic emulsifier may be added in such a quantity that, depending on its phospholipid content, 0.1 to 1% by weight, preferably 0.15 to 0.35% by weight and, more preferably, approximately 0.20% by weight phospholipids are present in the final evaporated milk, for example with approximately 0.18% added phospholipids and approximately 0.07% phospholipids naturally present in the evaporated milk, for example with 30% solids and 10% fats.

The invention is illustrated by the following Examples in conjunction with the accompanying drawings. In the Examples, parts and percentages are by weight, unless otherwise indicated.

EXAMPLES

Figure 1:
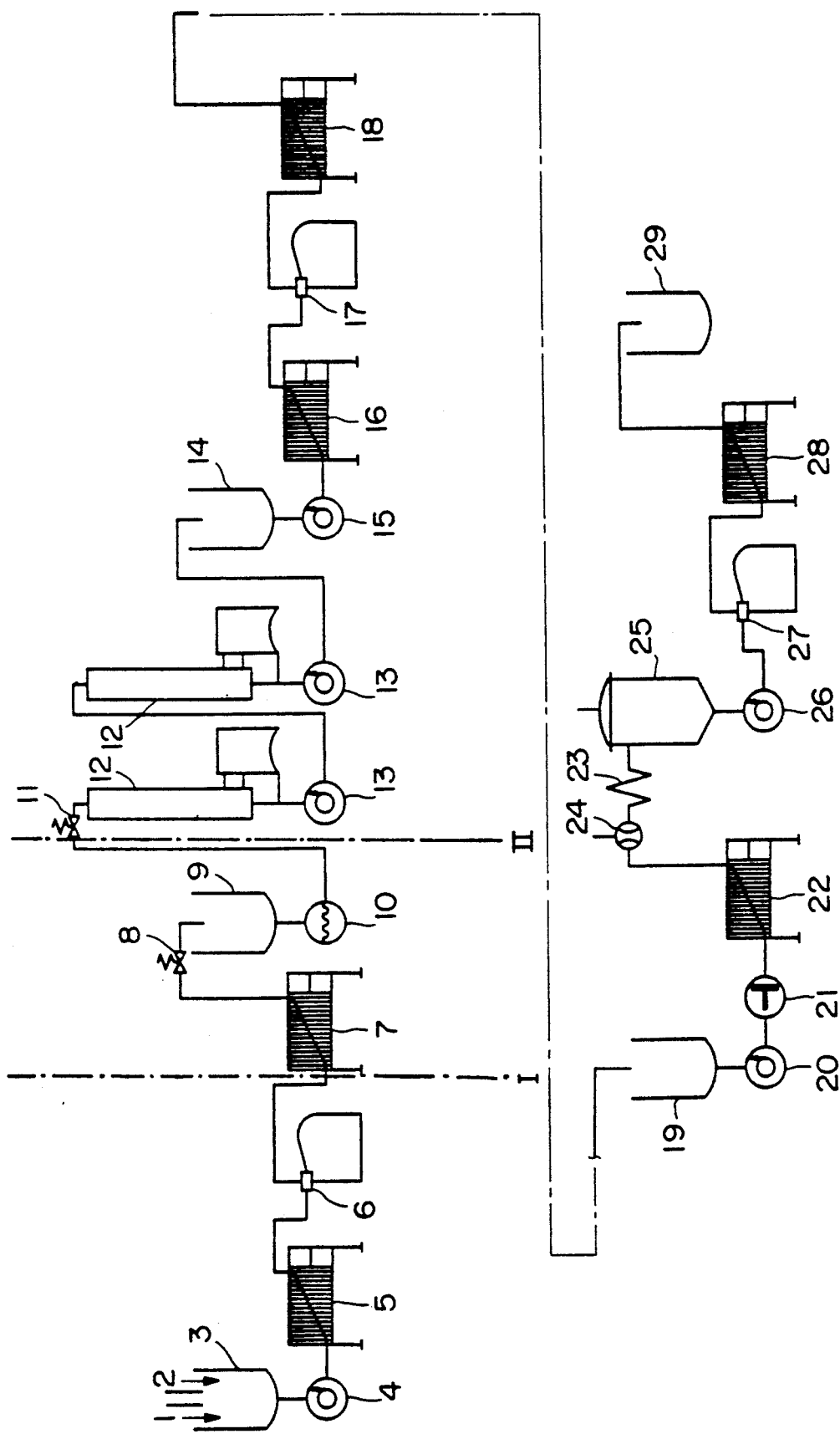
FIG. 1 schematically illustrates a first embodiment of the process according to the invention.

In Examples 10 to 14, the milk phospholipid content of the emulsifier is determined by analysis of the phosphorus in the fats in accordance with R. Walstra et al., Neth. Milk & Dairy J. 16 (1962).

EXAMPLE 1

In this Example, the process is described with reference to FIG. 1. 255 kg of untreated whole milk containing 3.8% fats and 9% non-fat milk solids (1) and 0.86 kg cream containing 36% fats and 5.7% non-fat milk solids (2) are mixed in the tank 3.

The mixture is passed by a centrifugal pump 4 through the plate-type heat exchanger 5 in which it is preheated to 80° C. and then through the homogenizer 6 in which it is homogenized in two stages, first under a pressure of 250 bar and then under a pressure of 50 bar. The mixture then passes into the plate-type heat exchanger 7, in which it is heated to 118° C., and is then cooled by expansion to 96° C. by means of the controlled valve 8, being kept at that temperature for 8 minutes in the tank 9. The rotary piston pump 10 then delivers the mixture via the controlled valve 11 to the double-effect falling-float evaporator 12 in which it is concentrated to a dry matter content of 35% by expansion in vacuo. It is then delivered by the pumps 13 into the buffer tank 14 and, from there, by the centrifugal pump 15 to the plate-type heat exchanger 16 in which it is heated to 65° C. It then passes through the homogenizer 17 in which it is homogenized in two stages, first under a pressure of 75 bar and then under a pressure of 25 bar, cooled to 40° C. in the plate-type heat exchanger 18 and then left standing at that temperature for 12 h in the buffer tank 19. During this period, the dry matter content is adjusted to 33% by addition of water.

The concentrate is then taken up by the centrifugal pump 20, after which it is pumped by the piston pump 21 through the plate-type heat exchanger 22, in which it is preheated to 80° C., and then into the tube 23 in which it is heated to 135° C. by direct injection of steam at 24 and in which it is kept at that temperature for 5 s and, finally, into an expansion vessel 25 where its temperature falls to 78° C. At the bottom of the expansion vessel, the centrifugal pump 26 takes up the concentrate and delivers it to the homogenizer 27 in which it is homogenized in two stages, first under a pressure of 75 bar and then under a pressure of 25 bar, and then to the plate-type heat exchanger 28, in which it is cooled to 4° C., and finally to the tank 29 to await filling.

100 kg evaporated milk containing 10% lactic fats and 23% non-fat milk solids are obtained. After packing in cans and crimping of the cans, the product is sterilized for 12 minutes at 118.3° C. (these operations have not been shown). The product has the same stability in storage at ambient temperature as an evaporated milk stabilized with phosphate salts.

EXAMPLE 2

The procedure is as in Example 1, except that 243.87 kg untreated whole milk containing 4.1% fats and 8.9% nonfat milk solids and 14.4 kg skimmed milk containing 0.01% fats and 9% non-fat milk solids are used. 100 kg evaporated milk containing 10% lactic fats and 23% non-fat milk solids are thus obtained. The product has the same stability in storage at ambient temperature as an evaporated milk stabilized with phosphate salts.

EXAMPLES 3-9

The procedure is as in Example 1, the milk and the cream being mixed to obtain the proportions indicated under the operating conditions indicated in Table 1 below.

Figure 2:
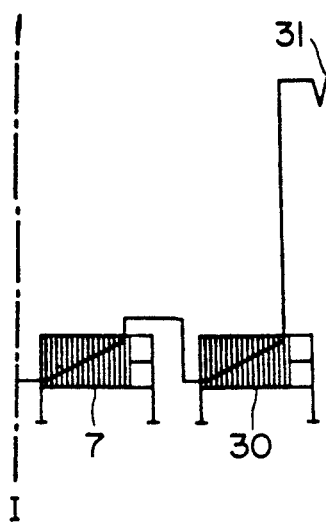
FIG. 2 schematically illustrates a first variant of the first heat treatment comprised between the dotted lines I and II in FIG. 1.
Figure 3:
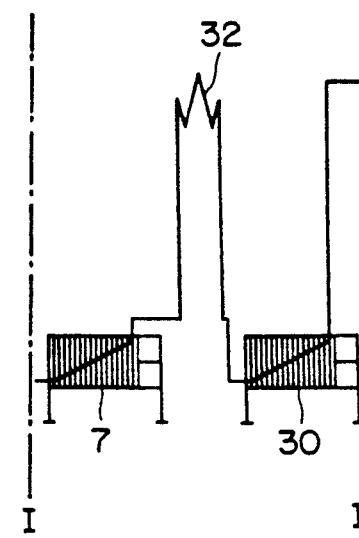
FIG. 3 schematically illustrates a second variant of the first heat treatment comprised between the dotted lines I and II in FIG. 1.
Figure 4:
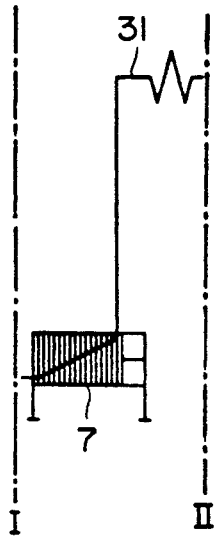
FIG. 4 schematically illustrates a third variant of the first heat treatment comprised between the dotted lines I and II in FIG. 1.

In Table 1, the parameters of the various stages of the several variants of the process are indicated by reference to the apparatus designated by their respective reference numerals in FIGS. 1 to 4. Thus, Examples 3, 4 and 5 correspond to a heat treatment before evaporation using the plate-type heat exchangers 7 and 30 and then the holding tube 31 (FIG. 2). Examples 5 and 6 comprise a heat treatment before evaporation similar to that of Example 1 using the controlled valve 8 and the tank 9 (FIG. 1). Example 7 uses the holding tube 32 between the plate-type heat exchangers 7 and 30 (FIG. 3) for the heat treatment before evaporation. In Example 8, the valve 11 is controlled in such a way that the temperature in the holding tube 31 is the same as at the exit of the plate-type heat exchanger 7 (FIG. 4).

TABLE 1

| Example | | 3 | 4 | 5 | 6 | 7 | 8 | 9 |
|---|---|---|---|---|---|---|---|---|
| Dry matter % | | 31 | 33 | 33 | 33 | 30 | 30 | 24 |
| Ratio of fats to non-fat solids %/% | | 10/21 | 10/23 | 10/23 | 10/23 | 15/15 | 15/15 | 4/20 |
| of the process according to FIGS. 1, 2, 3 and 4 | | | | | | | | |
| Reference numeral | | | | | | | | |
| 5 | (°C.) | 80 | 80 | 60 | 80 | 90 | 80 | 80 |
| 6 | (bar) | 250 + 50 | 250 + 50 | 225 + 50 | 300 + 50 | 200 + 50 | 250 + 50 | 250 + 50 |
| 7 | (°C.) | 118 | 118 | 118 | 118 | 118 | 120 | 118 |
| 9 | (°C./s) | — | — | 95/480 | 95/480 | — | — | — |
| 32, 30 | (s/°C.) | — | — | — | — | 120/95 | 120/120 | — |
| 30, 31 | (°C/s) | 95/480 | 95/480 | — | — | — | — | 95/480 |
| 16 | (°C.) | 65 | 65 | 65 | 65 | 65 | 65 | 65 |
| 17 | (bar) | 75 + 25 | 75 + 25 | 75 + 25 | 125 + 25 | 75 + 25 | 175 + 25 | 75 + 25 |
| 22 | (°C.) | 80 | 80 | 80 | 80 | 80 | 80 | 80 |
| 23, 24 | (°C.) | 115 | 135 | 128 | 130 | 118 | 130 | 115 |
| 23 | (s) | 120 | 5 | 5 | 10 | 240 | 5 | 120 |
| 25 | (°C.) | 78 | 78 | 78 | 78 | 78 | 78 | 78 |
| 27 | (bar) | 75 + 25 | 75 + 25 | 75 + 25 | 125 + 25 | 75 + 25 | 200 + 50 | 75 + 25 |
| 28 | (°C.) | 4 | 4 | 4 | 4 | 4 | 4 | 4 |
| Sterilization in cans °C./min. | | 118/12 | 120/10 | 118/12 | 118/12 | 118/12 | 118/12 | 118/12 |

The product has the same stability in storage at ambient temperature as an evaporated milk stabilized with phosphate salts.

EXAMPLE 10

Figure 5:
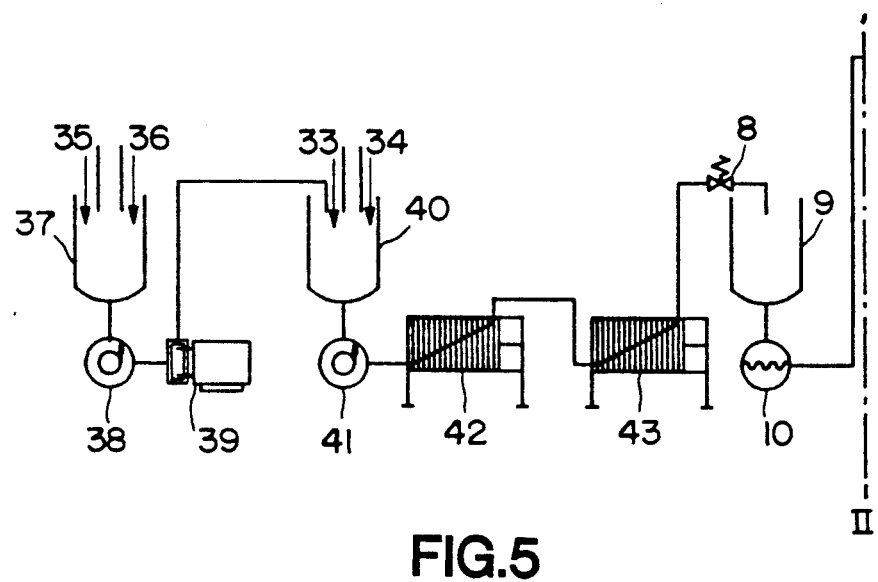
FIG. 5 schematically illustrates a second embodiment of the process according to the invention as far as the dotted line II in FIG. 1.

In this Example, the process is described with reference to FIGS. 1 and 5. In FIG. 5, 228.86 kg untreated whole milk (33) containing 4% fats and 9% non-fat milk solids, 0.39 kg cream (34) containing 36% fats and 5.7% non-fat milk solids and a 10% dispersion of 4.72 kg commercial buttermilk powder (35) containing 14.72% fats, 82.35% non-fat milk solids and 3.81% milk lecithin (milk phospholipids determined by analysis of the phosphorus in the fats) are mixed in water (36). The dispersion is prepared by premixing in the tank 37, taken up by the centrifugal pump 38 and delivered to the colloid mill 39 before being mixed with the milk and cream in the tank 40. The centrifugal pump 41 then delivers the mixture to the plate-type heat exchangers 42 and 43 in which it is heated to 118° C. The mixture is then treated as in Example 1, but under the different operating conditions shown in Table 2 below with reference to FIG. 1:

TABLE 2

| FIG. 1, reference numeral | | Conditions |
|---|---|---|
| 16 | (°C.) | 70–75 |
| 17 | (bar) | 100 + 25 |
| 23, 24 | (°C.) | 145–150 |
| 23 | (s) | 3 |
| 27 | (bar) | 100 + 25 |
| Sterilization in cans °C./mins. | | 95/15 + 118/12 |

The product has the same stability in storage at ambient temperature as an evaporated milk stabilized with phosphate salts.

EXAMPLE 11

The procedure is as in Example 10, except that the milk lecithin is added to the tank 14 (FIG. 1) after the concentration by evaporation.

EXAMPLE 12

The procedure is as in Example 10 using a buttermilk powder enriched with milk phospholipids giving 0.18% milk phospholipids in the final evaporated milk.

To prepare the buttermilk powder, melted butter is centrifuged in an opening bowl separator and the aqueous phase consisting of buttermilk of anhydrous lactic fats containing 15.23% dry matter, including 7.63% fats and 3.85% lactose, pH 6.65, is collected. The aqueous phase thus collected is pasteurized for 15 s at 73° C. in a scraped-surface heat exchanger and subsequently cooled to 50° C. in this heat exchanger. It is then subjected to ultrafiltration in a 9 m$^2$ ultrafiltration module of which the membranes have a cutoff zone of 20,000 daltons. The retentate is collected and spray-dried in a spray-drying tower. The powder contains 14% milk phospholipids (as measured by analysis of the phosphorus in the fats).

EXAMPLE 13

The procedure is as in Example 10 using a buttermilk powder enriched with milk phospholipids giving 0.18% milk phospholipids in the final evaporated milk.

To prepare the buttermilk powder, a skimmed sweet buttermilk containing 7% dry matter and 0.8% fats and 3.3% lactose, pH 6.81, is used. It is pasteurized for 15 s at 75° C. in a plate-type heat exchanger, cooled to 40° C. in a plate-type heat exchanger and then acidified to pH 4.6 with a 20% citric acid solution to precipitate the casein. The casein is separated in a centrifuge and a serum containing 5.58% dry matter is collected. After neutralization to pH 6.7 with a 1N aqueous sodium hydroxide solution, the serum is pasteurized for 15 s at 80° C. in a scraped-surface heat exchanger and then cooled to 50° C. in this heat exchanger. It is then subjected to ultrafiltration in a 9 m$^2$ ultra-filtration module of which the membranes have a cutoff zone of 20,000 daltons. The retentate is collected, concentrated to 28–32% dry matter in a double-effect evaporator and then spray-dried in a spray-drying tower. The powder contains 14% milk phospholipids (as measured by analysis of the phosphorus in the fats).

EXAMPLE 14

The procedure is as in Example 10 using a natural lactic emulsifier from the production of cooked cheeses which gives 0.18% milk phospholipids in the final evaporated milk. A fatty phase is collected by centrifugation of whey from the production of Parmesan at 2,000 r.p.m./50° C. The fatty phase is then heated to a temperature of 75° C. in a scraped-surface heat exchanger and then treated by two passes through a centrifugal decanter. The aqueous phases, pH 4.4–4.6, are then combined into a single phase of which the pH is adjusted to 6.1 by addition of a 1N aqueous sodium hydroxide solution, subsequently pasteurized for 5 s at 95° C. in a scraped-surface heat exchanger, concentrated to a dry matter content of 18 to 20% in a falling float evaporator and, finally, spray-dried in a tower. The powder obtained contains 5% milk phospholipids (as measured by analysis of the phosphorus in the fats).

EXAMPLE 15

The procedure is as in Example 1 up to the sterilization step. To carry out sterilization, the concentrate coming from the tank 29 is preheated to 80° C. in a platetype heat exchanger, sterilized at 120° C. in a plate-type heat exchanger and then kept at that temperature for 7 minutes in a holding tube. It is then expanded in a vessel, in which its temperature falls to 78° C., and homogenized in two stages, first under a pressure of 200 bar and then under a pressure of 50 bar, the homogenizate is cooled to 20° C. in a plate-type heat exchanger and then packed in cans which are hermetically sealed. Expansion, homogenization, cooling and packing are all carried out under aseptic conditions.

The product has the same stability in storage at ambient temperature as an evaporated milk stabilized with phosphate salts.

EXAMPLE 16

The procedure is as in Example 3 up to the sterilization step. To carry out sterilization, the concentrate coming from the tank 29 is preheated to 75° C. in a plate-type heat exchanger, sterilized at 140° C. by direct injection of steam and kept at that temperature for 10 s in a tube (ultra-high temperature sterilization). After cooling to 73° C. in a plate-type heat exchanger, it is homogenized in two stages, first under a pressure of 250 bar and then under a pressure of 50 bar, the homogenizate is cooled to 20° C. in a plate-type heat exchanger and then packed in cartons which are hermetically sealed. All the steps following sterilization are carried out under aseptic conditions. The product has the same stability in storage at ambient temperature as an evaporated milk stabilized with phosphate salts.

By way of comparison, an evaporated milk treated in the same way, but without the steps of homogenization of the starting prod.uct, heat treatment of the homogenizate before concentration, heat treatment and homogenization of the concentrate described in detail in Example 3, gelled rapidly after an ultra-high temperature sterilization treatment.

We claim:

1. A process for the production of an evaporated milk product containing fats comprising;

mixing a lactic product containing phospholipids derived from milk with a milk product, wherein the milk product has a ratio by weight of fats to non-fat dry matter of from 0.1:1 to 1.2:1, to form a mixture of the latctic and milk products;

heat-treating the mixture to stabilize bonds between proteins;

evaporatively concentrating the heated mixture to a dry matter content of from 20% to 40% by weight;

heat-treating the concentrate to stabilize proteins bound by partial denaturing;

homogenizing the heat-treated concentrate; and sterilizing the homogenized concentrate.

2. A procses for the production of an evaporated milk product containing fats comprising:

heat-treating a milk product having a ratio by weight of fats to non-fat dry matter of from 0.1:1 to 1.2:1 to stabilize bonds between proteins;

evaporatively concentrating the heated milk product to a dry matter content of from 20% to 40% by weight;

mixing a lactic product containing phospholipids derived from milk with the concentrated milk product to form a mixture of the lactic and concentrated milk products;

heat-treating the mixture to stabilize proteins bound by partial denaturing;

homogenizing the heat-treated mixture; and sterilizing the homogenized mixture.

3. A process according to claim 1 or 2 wherein the lactic product is mixed in an amount with the milk product such that from 0.1% to 1% by weight milk phospholipids are present in the sterilized homogenized mixture.

4. A process according to claim 1 or 2 wherein the lactic product is mixed in an amount with the milk product such that from 0.15% to 0.35% by weight milk phospholipids are present in the sterilized homogenized mixture.

5. A process according to claim 1 or 2 wherein the lactic product is sweet buttermilk.

6. A process according to claim 1 or 2 wherein the lactic product is a buttermilk product selected from the group of buttermilk products consisting of sweet buttermilk, a buttermilk from the production of butter oil, a buttermilk from the production of anhydrous lactic fats, a buttermilk fraction freed from proteins, a buttermilk fraction freed from casein, a buttermilk fraction at least partly freed from lactose, and mixtures thereof.

7. A process according to claim 1 or 2 wherein the lactic product is a whey fraction from production of cooked cheese.

8. A process according to claim 1 or 2 wherein the lactic product is a whey fraction from production of cooked curd cheese enriched with polar lipids.

9. A process according to claim 1 or 2 wherein the lactic product is in a form of a dispersion in an aqueous medium.

10. A process according to claim 1 or 2 further comprising homogenizing the concentrate.

11. A process for the production of an evaporated milk product containing fats comprising:

homogenizing a milk product having a ratio by weight of fats to non-fat dry matter of from 0.1:1 to 1.2:1 to bind proteins;

heat-treating the homogenized milk product to stabilize bonds between proteins;

evaporatively concentrating the heat-treated homogenized milk product;

heat-treating the concentrate to stabilize proteins bound by partial denaturing;

homogenizing the heat-treated concentrate; and sterilizing the heat-treated concentrate.

12. A process according to claim 11 further comprising heating milk product to a temperature of from 50° C. to 100° C. before homogenizing it and further comprising homogenizing the concentrate before heat-treating the concentrate.

* * * * *

UNITED STATES PATENT AND TRADEMARK OFFICE
CERTIFICATE OF CORRECTION

PATENT NO. : 5,223,299
DATED : June 29, 1993
INVENTOR(S) : Ernesto DALAN, et al.

It is certified that error appears in the above-identified patent and that said Letters Patent is hereby corrected as shown below:

Column 8, line 54 (line 7 of claim 1), "latctic" should be --lactic--.

Signed and Sealed this

Fifteenth Day of March, 1994

Attest:

BRUCE LEHMAN

Attesting Officer

Commissioner of Patents and Trademarks